May 18, 1954   R. L. MANGRUM   2,678,738
PORTABLE STORAGE CONTAINER
Filed June 18, 1951   2 Sheets-Sheet 1

INVENTOR.
RICHARD L. MANGRUM.
BY Fulwider and Mattingly
ATTORNEYS.

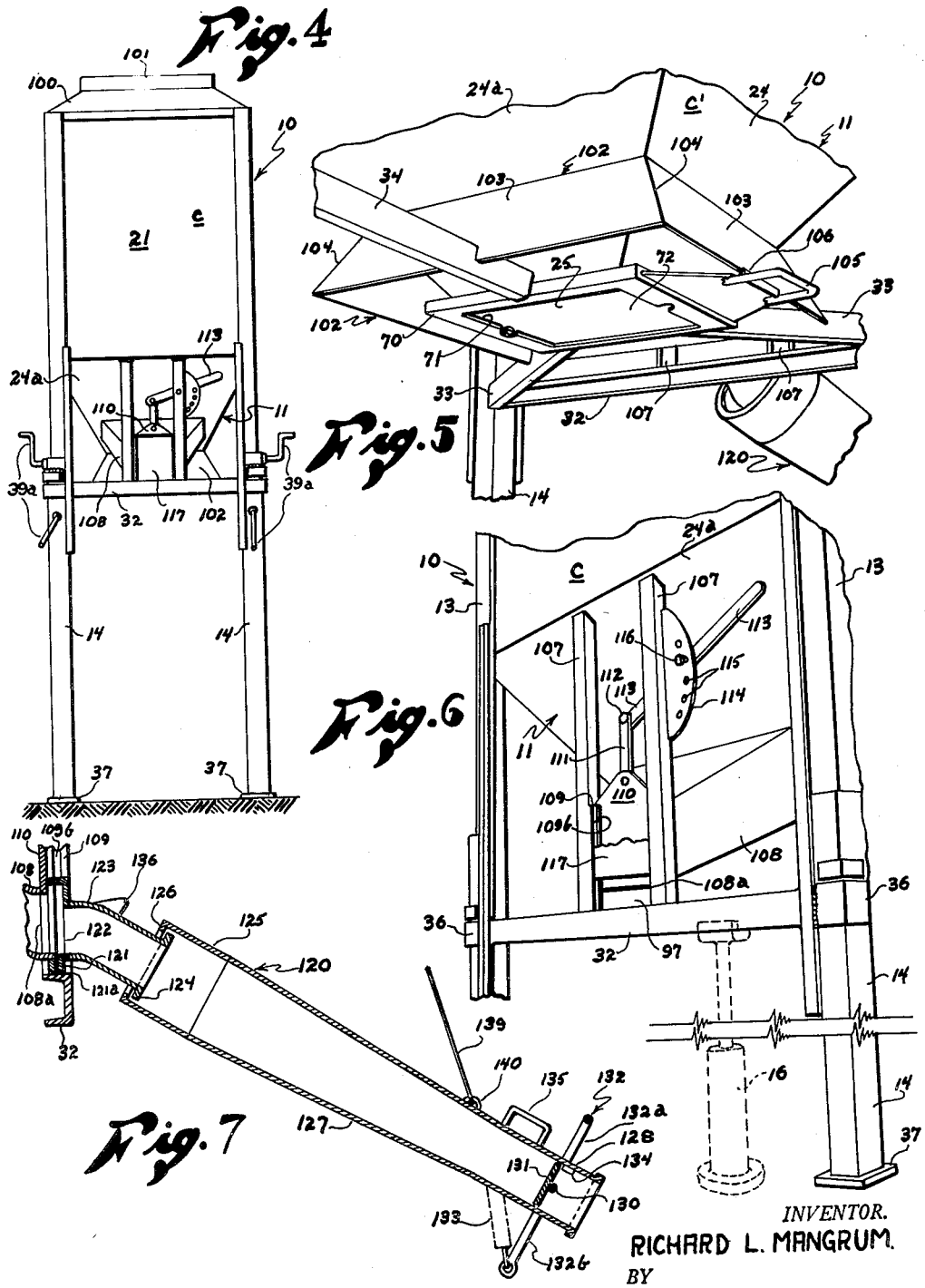

Patented May 18, 1954

2,678,738

UNITED STATES PATENT OFFICE 2,678,738

PORTABLE STORAGE CONTAINER

Richard L. Mangrum, Long Beach, Calif.

Application June 18, 1951, Serial No. 232,210

10 Claims. (Cl. 214—17)

The present invention relates to the field of portable storage containers, and is a continuation-in-part of co-pending application, Serial No. 118,171 filed in the United States Patent Office on September 27, 1949.

In the operation of both large and small farms and ranches, the trend for a number of years has been to purchase the grain or feed for livestock in bulk. In the past such feed was purchased and delivered to the farm or ranch in sacks, and still is to a limited extent, but this mode of delivery is expensive due to the necessary labor cost in the handling of the sacked material before and after delivery. Also there is a high percentage of waste in the use of sacked grain or feed as the sacks break in handling, do not protect the contents against rodents or mold and moisture, and are not waterproof. A further disadvantage in the use of sacked feed is that a suitable protective storage space must be provided.

The inherent disadvantages in the use of sacked feed or grain have been diminished to some extent by employing bulk storage bins. Bins of this type are filled from special conveyor trucks in which blowers or screw type conveyors are incorporated to discharge the feed or grain from the truck to the storage bin. Although this last mentioned method of handling is an improvement over the use of sacks, it still requires expensive handling equipment adapted for but one operation, that of handling bulk feed. Due to the limited use to which such a specialized conveyor truck may be put, it is frequently found that the use of the vehicle does not justify the capital investment required for its acquisition and maintenance.

The disadvantages found in the highly specialized bulk conveyor truck as a means of delivering bulk feed and other granular and subdivided material has been largely overcome by the development of the portable storage bin disclosed in co-pending application, Serial No. 118,171. The bin disclosed in said co-pending application is quite versatile. It may be carried on the flat bed of a conventional truck to permit easy transportation of a loaded bin from a source of supply to a destination where it may be left in exchange for an empty bin, and the process repeated as desired. This simple operation eliminates the use of specialized delivery equipment as well as the many disadvantages found in the use of sacks. Also, if desired, more than one bin may be carried on one vehicle, enabling a distributor to service more than one customer at a time in the same general area.

The use of the portable container disclosed in co-pending application Serial No. 118,171 eliminates the disadvantages of sacked feed as well as that of the bulk trucks, and in addition assures delivery of the exact weight desired. This weight feature is of utmost importance. Feed or grain is weighed at the time it is sacked, and if delivery is made after the sacked material has been in storage for some time, the weight per sack may vary considerably from the weight recorded at the time of sacking. Likewise, it is impossible to obtain an accurate weight of feed or other subdivided material delivered by bulk conveyor truck, as the material in the screw or blower cannot be computed, and there is always a certain doubt as to the exact weight of the material delivered.

When the portable containers disclosed in co-pending application Serial No. 118,171 and the present application are used, the weight of each bin is first determined when empty and then filled with feed or other material. The hinged doors at the top of the bin and the slidable closure members in the bottom of the bin are locked with a box car type seal. After the bin is filled and sealed it is again weighed, and the exact weight of the contents is easily computed. Thus, the purchaser is assured of securing the exact weight for which he pays in a storage bin that provides complete protection for the feed or grain as it is consumed.

While the bin disclosed in co-pending application Serial No. 118,171 has greatly decreased the delivery expense as well as the labor cost involved in making such deliveries, it has been found that the labor and time required to distribute feed material on the ranch or farm may be further reduced by the use of the bin disclosed in the present application.

The primary purpose in devising the present portable storage container is to provide a dual purpose bin. That is, one that may be used in the exact manner described in detail in co-pending application Serial No. 118,171, as well as one that may be removably positioned on the flat bed of a vehicle for dispensing feed to livestock feeding troughs, whether the vehicle on which the bin is mounted is moving or standing still.

It will be readily apparent that in raising turkeys, chickens and livestock on a large scale that feeding troughs would be scattered over a wide area. By the use of the portable storage container of the present application a farmer is not only able to store the feed or grain in good condition but may also readily dispense said feed as and wherever desired with a minimum of time and effort.

A major object of the present invention is to provide a dual purpose bin for storage purposes from which feed or other material may be discharged when the bin is situated in a stationary position on the ground or when mounted on the flat bed of a vehicle when said vehicle is in either a stationary position or in motion.

Another object of the invention is to supply a bin that has one or more tubular feed discharge members removably mounted thereon that are both longitudinally and angularly adjustable relative thereto.

A still further object of the invention is to furnish a bin that has weatherproof discharge outlets, with the lower discharge outlets so arranged that dew, rain, sleet or snow may not affect material situated within the confines of the bin when in proximity to the slidable closure members.

Yet another object of the invention is to provide a divided bin in which two different feeds or other material may be stored without intermingling, and from which the two materials may be concurrently discharged whether said bin is in a stationary position or moving on a vehicle.

A still further object of the invention is to furnish a portable storage container that has an extremely simple mechanical structure, may be fabricated from standard commercially available material, is simple to operate, requires little or no maintenance attention, and due to its versatility and advantages, will further increase the use of portable bins as a means of delivering and handling bulk feed and other subdivided materials.

These and other objects and advantages of the invention will become apparent from the following description of a preferred form thereof, and from the drawings illustrating that form in which:

Figure 4 is a side elevational view of the bin;

Figure 5 is a fragmentary perspective view of the lower discharge portions of one of the bins;

Figure 6 is a fragmentary perspective view of the gate structure on one of the bins; and Figure 7 is a fragmentary vertical cross-sectional view of one of the gates on the side of the bin, and a tubular feed discharge member removably connected thereto.

Figure 1:
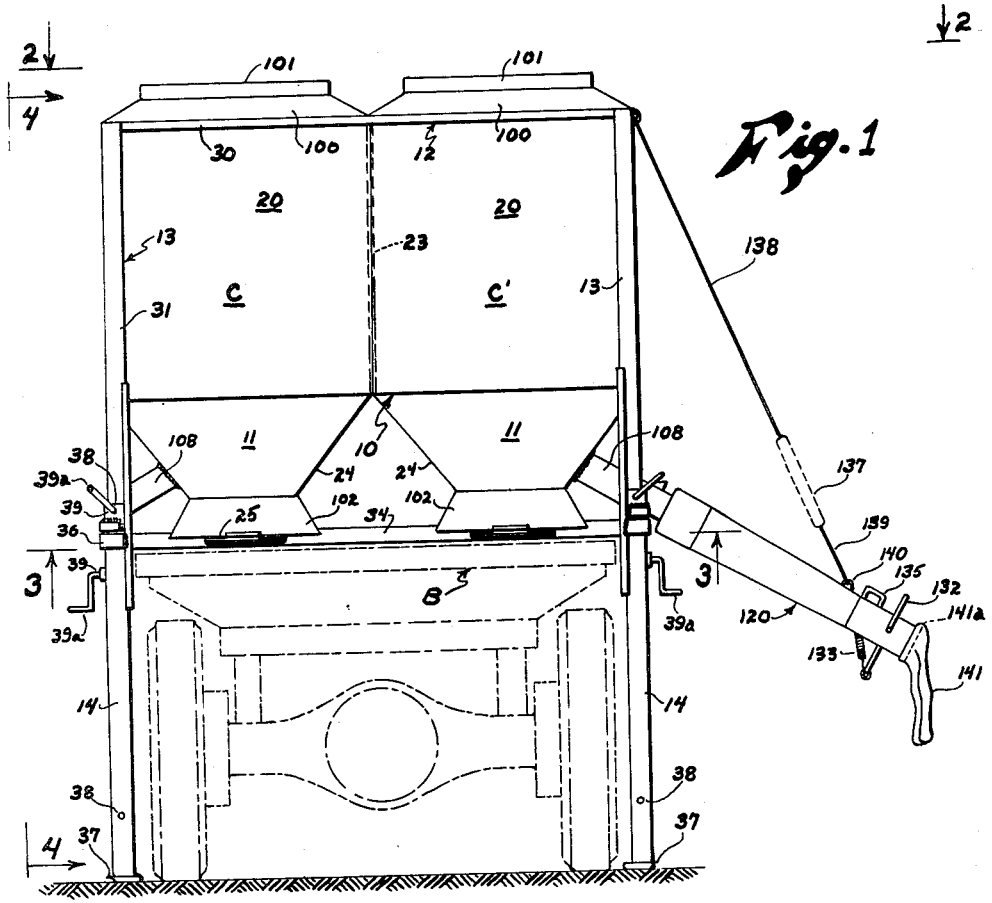
Figure 1 is a rear elevational view of the bin after it has been disengaged from the flat bed of a truck.
Figure 2:
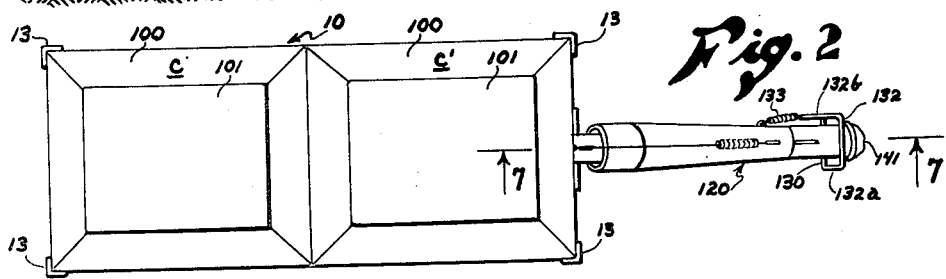
Figure 2 is a plan view of the device.

Referring now to the drawings for the general arrangement of the invention, it will be seen that the numeral 10 indicates a generally rectangular bin or tank which is internally divided into two separate compartments C and C' that are identical. Inasmuch as compartments C and C' are identical, the structure of compartment C only will be discussed in detail, with the remarks made in connection therewith applying equally well to compartment C'. An open rigid framework 12 forms a part of the bin 10, and serves to removably support the bin at all times.

The framework 12 includes four vertical, laterally spaced corner posts 13, with each of the posts positioned on one of the corners of bin 10 and affixed to the side walls of the bin by welding or other conventional means. The bin 10 may be removed from the truck bed B by lifting it upwardly relative thereto by the use of portable jacks 16 that removably engage a suitable portion of the bin structure as will hereinafter be explained in detail. The legs 14 are then lowered to the position shown in Figure 1, in which position they are locked to support the bin on the ground. Should it be more convenient in the loading and unloading of the bins, the truck bed B may be raised and lowered as a unit by jacks 16 as explained in detail in co-pending application Serial No. 118,171.

The detailed structure of bin 10 may best be seen in Figures 1 and 4. Bin 10 comprises generally vertical end walls 20 and side walls 21 joined together in a rectangular shape, forming with two hopper bottoms 11, a box-like container suitable for holding grain or other granular or subdivided material therein. Spaced laterally midway between the side walls 21 is an internal wall or divider 23, as is best seen in Figure 1, which creates within the bin 10 two separate compartments C and C' which have hopper bottoms 11.

Beneath each of the hopper bottoms 11 is a suitable horizontal gate 25, the detailed structure of which will hereinafter be explained. Each of the gates 25 is adapted to be slidably opened or closed to control the discharge of material from the particular bin on which the gate is mounted. As can be seen in Figure 1, the end walls 20 when the bin 10 is being transported, extend across the width of the truck bed B so that the side walls 21 slightly overhang the longitudinal edges of the bed.

The purpose of dividing the bin 10 into two compartments C and C' by the wall 23 is to provide storage for two separate types of material. It will, of course, be appreciated that the bin 10 may be formed as a single compartment, or with more than two compartments if desired. In the preferred form of the device I construct the bin 10 from a suitable lightweight material such as sheet metal, with all of the edges and seams thereof jointed by welding or other means to provide a lightweight and durable structure, which is both waterproof and fireproof.

Figure 3:
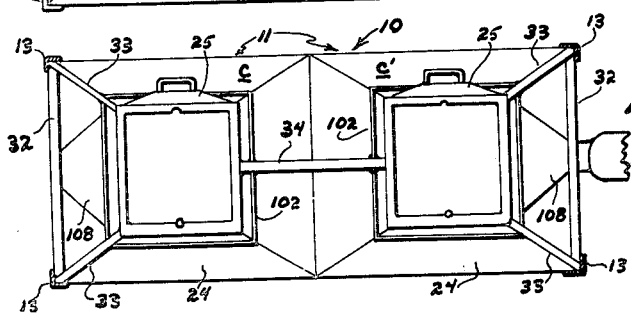
Figure 3 is a bottom plan view of the portable storage container looking upwardly on line 3—3 of Figure 1.

The open framework 11 surrounding the bin 10 is preferably formed of commercially available structural members such as angle iron to create a horizontal upper frame 30 that is welded or otherwise rigidly affixed to the upper edges of the bin 10. Extending downwardly from the frame 30 are vertical corner posts 31 of L-shaped cross section that are affixed to both the frame and to the walls 20 and 21. At the lower end of the corner posts 31, horizontal side members 32 are attached, as are base members such as diagonal braces 33 which extend inwardly in a horizontal plane (Figures 1 and 3) to support the lower ends of the hopper bottoms 11.

The diagonal braces 33 are rigidly attached on their inner ends to the hopper bottoms 11, with the lower faces of the braces that rest on the truck bed B disposed below the lowermost part of gates 25 in order that the gates will not be damaged by forceful contact with the bed in a bin unloading or loading operation. In addition to the above mentioned bracing, a horizontal spacer 34 is used between the adjacent inner sides of the hopper bottoms 11. As can be seen, the framework 12 protects and strengthens the bin 10, and also serves as a support therefor which is adapted to rest on the truck bed B in order that the weight of the loaded bin 10 is supported by the framework and not on the relatively light walls of the bin. The side members 32 not only serve as braces for the bin structure, but also provide a convenient rigid structure for engagement by jacks 16 in the loading and unloading of bins from the bed B.

Suitably attached on the lower portion of the corner posts 31 are vertical tracks 36 in which each leg member 14 is slidably mounted. As may be seen in the drawings, the leg member 14 is of right angular cross section and overlaps the corner posts 31, being guided and constrained thereon by the tracks 36 which are formed as L-shaped flanges along the edges of the corner posts. On the lower end of each leg 14 is a rectangular foot pad 37 adapted to rest on the ground or other supporting surface. Other types of feet members can be used, of course, such as casters or wheels to allow for movement about the feeding area, but the simple pad 37 shown herein is preferable because of its economical construction.

Near the upper and lower ends of the leg members 14 are sets of spaced bolt holes 38 adapted to have bolts 39 passed therethrough to enter similarly spaced holes in the lower end of the corner posts 31. Each of the bolts 39 has an outwardly extending handle 39a formed on the head portion thereof. Locking nuts (not shown) are welded or otherwise mounted on the rear surface of the corner posts 31 which are adapted to engage the threaded ends of the bolts 39 to firmly lock the legs 14 in position. The handles 39a permit engagement and disengagement of the bolts in a minimum of time without the use of a wrench. When the bolts 39 are passed through the upper set of holes, the legs 14 are locked in the downwardly extended position to support the weight of the bin 10, as best seen in Figure 4. When the bolts 39 are passed through the lower set of holes in legs 14, the latter are raised to a position adjacent the truck bed 13 where they ride during transportation of the bin as explained in detail in co-pending application Serial No. 118,171. Although the above described structure provides a simple and positive means for locking the legs 14 in either the up or down position, it is to be understood that other types of positive locking means may be used if desired.

The bin 10 is adapted to be removably positioned on the bed B, and firmly held thereon by the locking mechanism shown in detail in co-pending application Serial No. 118,171. The substantially rectangular openings at the top of compartments C and C' through which said compartments may be loaded, are provided with upwardly and inwardly tapered cover members 100. A waterproof lid 101 of suitable construction is hinged to the tapered cover member 100 in a conventional manner. The lower extremities of the cover members 100 are joined to the upper edge portions of the end walls 20, side walls 21, and partition 23 by flanges or other conventional means to effect a weather-tight seal therewith.

As may best be seen in Figures 1, 3, 4 and 5, a gate 25 is welded or otherwise firmly attached to the tapered walls 24 of each hopper bottom 11. A generally horizontally disposed box-like frame 70 is joined at its upper edges to the walls 24 that has a relatively large outlet opening 71 therein, as shown in Figure 5. One of the vertical sides of the frame 70 is slotted, with a closure member formed as a pan or tray 72 slidably mounted therein that is movable inwardly to register with and close the discharge opening 71.

A skirt 102 (Figure 5) is affixed to the lower portion of hopper 11 and extends downwardly and outwardly in a protective position over closure member 72. The skirt 102 is formed from four trapezoidal shaped sheet members 103 that are arranged in a generally rectangular shape and joined to one another at junction lines 104. Dew or other moisture running down the exterior of hopper 11, flows onto the exterior surface of skirt 102, dropping from the lower edge thereof to the ground. Thus, fluid is prevented from reaching closure member 72 to pass upwardly therefrom into the confines of the hopper. Closure member 72 has a U-shaped handle 105 extending outwardly from the free end thereof. A guard member 106 extends upwardly from the outer edge portion of closure member 72 and engages the lower outer edge of one of the members 103 when member 72 is moved to the closed position to prevent further inward movement thereof. Thus, any possibility of injury to the hand of a person grasping the handle 106 is eliminated due to inward movement of closure 72.

It will be particularly noted that the lower edge of skirt 102 is positioned above the lower supporting surfaces of members 32, 33 and 34, with the result that the skirt at no time bears any part of the load of the bin and may accordingly be fabricated from relatively light sheet material.

Each of the compartments C and C' is provided with two vertical laterally spaced rigid members 107 that extend downwardly from the lower edge of side wall 21 thereof to the side member 32 situated therebelow. Each of the hoppers 11 has an inclined delivery chute 108 of a generally tapered shape that extends outwardly from an opening formed in a side wall 24a thereof. Each of the chutes terminates in a rectangular discharge opening 108a between the two members 107 positioned adjacent to the hopper 11 from which the chute extends as may best be seen in Figures 4, 6 and 7. Chute 108 is fabricated from sheet metal and joined to the hopper side wall 24a and members 107 by welding or other conventional fastening means.

Each of the pairs of vertical members 107 mounted on bin 10 have two parallel and oppositely disposed sets of grooves 109a and 109b formed on the surfaces thereof facing one another. Grooves 109a and 109b are preferably formed by three laterally spaced ribs 109 provided for each of the vertical members 107 welded to the opposing faces thereof. Grooves 109a are inwardly positioned, with each of these pairs of grooves serving as vertical guides for a vertically movable gate member 110 formed from a rigid sheet material in a generally rectangular shape of larger dimensions than discharge opening 108a. Gate member 110 may be moved vertically, as will hereinafter be explained, to regulate the quantity of material discharged from opening 108a with which it is associated. Each side member 32 has a member 97 of somewhat less width mounted on the upper face thereof, with member 97 extending between the two opposing faces of members 32. The upper face of each of the members 97 is engaged by the lower edge of one of the gate members 110 when the gate member is in the closed position, as shown in Figure 4.

Each of the gate members 110 has a link 111 pivotally connected to the upper portion thereof. Link 111 extends upwardly from gate member 110 and is pivotally connected by a pin 112 to the end of a lever 113.

Lever 113 is pivotally supported by a pin (not shown) on the inner face of one of the members 107. A semi-circular plate 114 is affixed to and extends outwardly from the member 107 to support lever 113, and has a number of circumferentially spaced openings 115 formed therein. Lever 113 has an opening (not shown) that may register with any one of the openings 115 when the lever is pivoted to the proper position. By pivoting lever 113 the gate member 110 is moved vertically, and when this member is in the desired position a bolt or pin 116 may be inserted through the appropriate opening 115 to engage the opening formed in lever 113. Thus gate member 110 is held in a locked position relative to discharge opening 108a. It is of utmost importance that gate member 110 not be inadvertently opened (prevented by the above described construction) for should such an opening occur, the contents of compartment C or C' could be lost during transportation of the bin.

Although it is virtually impossible when ordinary precaution is taken for the gate member 110 to open from the locked position, this remote contingency is completely eliminated by providing a safety plate 117 for each of the gate members 110. The safety plate 117 is rectangular in shape, and of substantially the same dimensions of gate member 110. Before transporting a loaded bin 10 on a vehicle, the safety plate 117 is slidably inserted within the confines of two of the opposed grooves 109b, with the lower end portion of the plate disposed in front of member 97 and resting on the upper surface of member 32. Thus safety plate 117 completely blocks the chute discharge opening 108a, even though gate member 110 is placed in the open position. Should it be desired from a further precautionary standpoint, the safety plate 117, as well as gate member 110, may be locked in a closed position relative to chute discharge opening 108a by the use of conventional strip railroad freight car seals (not shown).

Groove 109b and ribs 109 defining same serve a dual purpose, for in addition to providing a support for safety plate 117, they also permit a tubular material discharge assembly 120 (shown in detail in Figure 7) to be removably mounted on the bin in communication with either of the chutes 108. Of course, by using two of the tubular discharge assemblies 120, material may be concurrently discharged from the two compartments C and C'.

As may best be seen in Figure 7, tubular discharge assembly 120 includes a substantially rectangular flange of such dimensions that the edge portions 121a thereof may be slidably inserted in the grooves 109b. The positioning of the flange 121 in grooves 109b can only take place after the safety plate 117 has been removed therefrom. Thus flange 121 cooperates with grooves 109b to removably support the tubular discharge assembly from the bin 10 and maintain communication with either of the compartments C or C' depending on which side of the bin the assembly is mounted.

Flange 121 has an aperture 122 extending therethrough which is in communication with a downturned tubular member 123 welded to the exterior of the flange. A rigid ring 124 is mounted on the extreme outer exterior surface of tubular member 123 disposed substantially normal to the longitudinal axis thereof.

Ring 124 is of slightly smaller diameter than the interior diameter of a cylindrical shell 125 of constant annular cross section in which it is mounted. Shell 125 either has the rearward edge portion thereof bent inwardly, or a rigid ring 126 welded to the interior surface thereof to form a stop to prevent disengagement of the tubular 123 and the shell. It will be apparent that due to the larger interior diameter of shell 125, the shell may be longitudinally and angularly adjusted relative to the fixed open end of tubular member 123.

An inwardly tapering tubular member 127, preferably fabricated from a rigid sheet material, extends outwardly from the forward edge of shell 125, and terminates in a tubular discharge nozzle 128 of constant annular cross section. Two oppositely disposed openings are formed in the side wall of nozzle 128, and rotatably support a shaft 130 therebetween. An annular plate 131 is rigidly affixed to shaft 130 within the confines of nozzle 128 as may best be seen in Figure 7.

A U-shaped valve handle 132 is provided that has two downwardly extending legs 132a positioned on opposite sides of the nozzle 128. Legs 132a are rigidly connected to end portions of shaft 130 that project outwardly through openings 129. One of the legs 132a has a downwardly extending projection 132b which has an eye formed on the free end thereof that is engaged by one end of a helical spring 133. Spring 133 extends upwardly and inwardly with the opposite end thereof affixed to a rigid member (not shown) that extends outwardly from tubular member 127. The spring 133 is at all times under tension, and normally maintains plate 131 in the nozzle closing position shown in Figure 7. A stop 134 formed on the upper interior surface of the nozzle 128 prevents clockwise rotation of the plate 131 beyond a position normal to the longitudinal axis of the nozzle. The plate 133 is rotated counterclockwise to a position where feed or other material may discharge from nozzle 128 by appropriate movement of handle 132.

A handle 135 of conventional design is mounted in a fixed position on the upper surface of nozzle 128 for use in angularly and longitudinally adjusting the movable porton 120a of the tubular discharge assembly relative to the fixed tubular member 123. In Figure 7 it will be seen that a triangularly shaped plate 136 is welded to the upper surface of tubular member 123 to restrict the longitudinal movement of shell 125 relative to ring 124.

To lessen the manual work involved in the use of the present invention, a helical spring 137 is provided that is connected at one end by a cable 138 to frame 30, and at the other end by a cable 139 to a projecting member 140 on tubular member 127. Spring 137 is of such resiliency that the weight of tubular discharge member 120 when filled with feed or other material is supported in substantially the position shown in Figure 1. An open sack 141 clamped onto the outer end of nozzle 128 by a removable ring 141a or other suitable fastening means, with the sack serving to evenly distribute feed or other material flowing therethrough.

The use and operation of the present invention is extremely simple. However, unlike the portable storage container disclosed in co-pending application Serial No. 118,171, the present invention is a dual purpose device. It may be used in exactly the same manner as the bin described and claimed in said co-pending application, or it may be used to discharge material from either compartment C or C', or both, by use of the tubular discharge assembly 120. Also material may be discharged from compartments C or C' by use of tubular discharge assemblies 120 when bin 10 is mounted on the flat bed B of a vehicle or when the bin is supported on the ground surface by legs 14.

The bins 10 described in both this application, co-pending application Serial No. 118,171, are preferably filled with feed or other material at a mill or other source of supply for distribution. When bins 10 of the present invention are used, the tubular discharge member 120 is not affixed thereto until after delivery. It will be apparent, of course, that the gate members 110, safety plates 117, and closure members 72 must be in the closed position prior to loading of bin 10. After the bin 10 is so loaded, lids 101 are placed in the closed position and railroad type metallic strip seals affixed to engageable members (not shown) on the lids 101, closure members 72, and gate members 110 to completely seal the bin until it is delivered.

The loaded bin 10 is placed on the flat bed B of a truck or other vehicle, and is removably locked in position thereon by the device disclosed in detail in co-pending application Serial No. 118,171. One or more bins may then be transported by the vehicle V to any desired location and removed therefrom by first disengaging it from the locking device and then raising the bin by use of a jack 16 that engages the side members 32. The legs 14 are then lowered to the ground surface and locked in the vertical position to permit the vehicle V to be driven forwardly, leaving the loaded bin standing on the ground surface. When it is desired to load one of the bins 10 onto the flat bed B of a vehicle, the above described operation is simply reversed.

The farmer or rancher who orders one of the bins 10 of the present invention is, of course, supplied with one or more of the tubular discharge assemblies 120 which are kept on the ranch or farm. The farmer, rancher, or other user of the present invention has the choice of using the bin 10 when delivered in a stationary position supported on the ground by legs 14, or when mounted on a flat bedded vehicle for use in distributing feed to livestock or fowl. When the bin 10 is used in a stationary position on the ground surface, the seals on the bin are broken to permit opening of closure members 72 and feed or other material is discharged through gates 25 into wheelbarrows or other suitable containers.

Should it be desired, the safety plate 117 may be removed and the tubular discharge member 120 mounted on bin 10 in communication with compartment C by inserting flange 121 in the appropriate set of grooves 109b. As previously discussed, compartments C and C' may be used concurrently in this manner if so desired. Gate member 110 associated with the compartment from which it is desired to withdraw material is placed in the open position to permit material to flow into the tubular discharge assembly 120, from which it is dispensed by movement of handle 132.

When the bin 10 is used in the distribution of feed or other material from the flat bed of a vehicle, the closure members 72 are preferably left in the locked and closed position. The safety plate 117 is then removed to permit one of the tubular discharge assemblies to be removably positioned on the bin 10 in communication with one or both of the compartments from which it is desired to dispense material. Material may, of course, be concurrently discharged from compartments C and C' by the use of two tubular discharge assemblies 120 mounted on opposite sides 21 of the bin.

After the tubular discharge assemblies 120 are so mounted, the gate members 110 are raised by use of levers 113 to a position where material may flow from the interior of the compartments into the tubular members. The tubular discharge assembly 120 is immediately filled with material from the compartment but this material is not discharged from the movable tubular members 120a as plate 131 is held in a nozzle closing position due to the tension of spring 133. At the time the tubular discharge assembly 120 is mounted on the bin 10 it is removably connected to cable 138 whereby substantially all of the weight of the loaded tubular discharge member 120a is supported by spring 136 and vertical members 107.

The vehicle on which the bin 10 is mounted for distribution of material by use of discharge assembly 120 is normally the same type used in the transportation of the bin to the ranch or farm.

For certain distributing operations it is usual practice for a man to longitudinally or angularly adjust the tubular discharge member at the proper position. All but a small fraction of the material situated in compartments C and C' may be discharged through tubular members 120a. The balance of the feed remaining in the bottom of the hoppers 11 is removed by opening the closure members 72 when the bin is supported on the ground surface by legs 14. After the bin 10 is emptied in the above described manner it is ready for return to the mill or other source of supply to be exchanged for another loaded bin. When the empty bin is received by the mill or source of supply it is cleaned if necessary and the previously described cycle is again repeated.

It is again pointed out that the bin of the present invention not only may be used in exactly the same manner as the bin disclosed in co-pending application Serial No. 118,171, but in addition, may be used for the distribution of feed or other material through the tubular discharge assembly 120 whether the bin is mounted on the flat bed of a vehicle or standing on the ground surface. Thus users of the invention disclosed in the present application are provided with a storage bin that can perform all of the functions of the bin disclosed in said co-pending application, plus all of the additional functions above described in detail. As a result, it is not necessary for a mill or other distributor to stock both types of portable storage containers.

Although the invention herein described is fully capable of achieving the objects and providing the advantages hereinbefore mentioned, it is to be understood that it is merely illustrative of the presently preferred embodiment of the invention and that it is not to be limited to the details of construction herein described other than as defined in the appended claims.

The invention claimed is:

1. A portable storage bin which includes: a generally rectangular storage bin; an outer framework attached to said bin, said framework comprising an upper frame around the top edges of said bin and generally vertical corner posts extending downwardly from said upper frame; a rigid horizontally positioned side member that overhangs the longitudinal sides of the flat bed of a vehicle when said bin is mounted thereon, with said member rigidly affixed to two of said corner posts; two substantially vertical longitudinally spaced rigid members, with the lower ends of said members affixed to one of said side members, and the upper ends of said members to said bin; a chute extending outwardly from an opening formed in said bin bottom portion and terminating in a discharge opening between said two vertical members; a gate member having larger external dimensions than said discharge opening in said chute; means to movably support said gate member from said two members in a position to control the flow of material from said discharge opening; lever means to move said gate member relative to said discharge opening; means to lock said gate member in the desired position relative to said discharge opening; means on said two vertical members to removably support a safety plate in a position to completely block said chute discharge opening to prevent inadvertent spillage of material from said bin; and means to removably support a tubular discharge member from said safety plate supporting means when said plate is removed therefrom, with said discharge member in communication with said chute when said gate member is in an open or partially open position.

2. A portable storage bin which includes: a generally rectangular storage bin having an inwardly tapered bottom portion; a framework attached to said bin for rigidly supporting said bin; material conveying means extending outwardly from said tapered bottom and in communication with the interior of said bin, with said conveying means terminating at the outer end thereof in a discharge opening; a first tubular member; means that removably support said first tubular member from said bin in a communicable position with said discharge opening; a second tubular member; means that support said second tubular member in an angular and longitudinally adjustable position from said first tubular member and in communication therewith; and valve means operatively associated with said second tubular member that control the flow of material therefrom.

3. A portable storage bin which includes: a generally rectangular storage bin formed with an inwardly tapered bottom portion having a movable closure member thereon to register with a discharge opening in said bottom portion; a framework attached to said bin for supporting said bin; a hollow material carrying member extending outwardly from said tapered bottom and in communication with the interior of said bin, with said material carrying member terminating on its outer end in a discharge opening; a first tubular member; means that removably support said first tubular member from said bin in a communicable position with said discharge opening in said material carrying member; a rigid annular member mounted on the outer end of said first tubular member, and extending outwardly therefrom; a second tubular member that has the interior rearward surface of the bore therein movably engage said annular member, with said second tubular member longitudinally and angularly adjustable relative to said first tubular member; means that maintain said first and second tubular member in movable engagement with one another; a plate pivotally supported in said second tubular member; handle means which when actuated vary the position of said plate to control the flow of material from said second tubular member; and spring means that maintain said plate in a closing position relative to said second tubular member except when said handle is actuated.

4. A portable storage bin which includes: a generally rectangular storage bin having an inwardly tapered bottom portion; a framework attached to said bin for supporting said bin; an enclosed chute extending outwardly from said bin bottom portion, and in communication with the interior thereof, with said chute terminating at its outer end in a discharge opening; a first tubular member; means to removably support said tubular member from said bin in a communicable position with said discharge opening in said chute; material flow control means disposed between said chute and said first tubular member; a rigid annular member mounted on the outer exterior end portion of said first tubular member; a second tubular member that movably engages said annular member within the interior rearward surface of the bore formed therein; an inwardly extending annular member positioned adjacent the rearward edge of said second tubular member that maintains said first and second tubular members in engagement and communication with one another, and permits said second tubular member to be longitudinally and angularly adjusted relative to said first tubular member.

5. A portable storage bin which includes: a generally rectangular storage bin having an inwardly tapered bottom portion; two substantially vertical longitudinally spaced rigid members affixed to said bin; an enclosed chute extending outwardly from said bin bottom portion and in communication with the interior thereof, with said chute terminating in a discharge opening between said two vertical members; a plurality of parallel elongated ribs mounted on said two members that form two opposed vertical grooves therewith; gate means operatively associated with said chute that regulate the quantity of material discharged therethrough from said bin; a first tubular member; a flange mounted on one end of said tubular member to removably engage said grooves when said safety plate is not in position therein to support said first tubular member in a communicable position with said discharge opening; an enlarged rigid member formed on the opposite end of said first tubular member; a second tubular member that has the interior surface thereof movably engage said enlarged member, and is longitudinally and angularly adjustable relative thereto; and material flow control means operatively associated with said second tubular member that control the flow of material therefrom.

6. A portable storage bin which includes: a generally rectangular storage bin having a top intake opening sealing with a water-tight lid member, an inwardly tapered bottom portion; a framework attached to said bin for supporting said bin; an enclosed chute extending outwardly from said bin bottom portion and in communication with the interior thereof, with said chute terminating in a discharge opening; a plate of larger dimensions than said discharge opening; means that movably support said plate in a position to control the flow of material from said discharge opening; means to alter the position of said plate relative to said discharge opening; means to lock said plate in the desired position relative to said discharge opening; means on each side of said discharge opening that define two oppositely disposed grooves; a first tubular member; a flange mounted on one end of said tubular member, with said flange capable of removably engaging said grooves to support said first tubular member in a communicable position with said discharge opening; an annular ring formed on the opposite end of said first tubular member, and disposed in a plane substantially normal to the longitudinal axis of that portion of said tubular member on which said ring is positioned; a second tubular member that has the interior surface thereof slidably engage the circumferential edge of said annular ring, and is longitudinally and angularly adjustable relative to said first tubular member; a shaft rotatably supported in oppositely disposed openings formed in the side walls of said second tubular members, with the end portions of said shaft extending outwardly from said second tubular member; an inverted U-shaped handle, with said handle having two oppositely disposed legs that are rigidly affixed to the outwardly extending ends of said shaft, and one of said legs extending below said shaft; an annular plate rigidly mounted on said shaft and situated within the confines of said second tubular member; a stop positioned on the interior surface of said second tubular member that is contacted by said annular plate when it is rotated to the closed position by said handle; a first spring affixed to the downwardly extending leg of said handle and to second tubular member, with said spring at all times in tension, and maintaining said annular plate in the closed position in contact with said stop except when the position of said plate is varied by the actuation of said handle; a second spring; a cable affixed to one end of said second spring and to said bin; and a second cable affixed to the opposite end of said second spring and said second tubular member whereby substantially all of the weight of said second tubular member is supported from said bin.

7. A removably mountable tubular discharge member for use with a portable bin which includes: a first tubular member; engageable means that may be rigidly mounted on a bin adjacent a discharge opening in communication with the interior of said bin; engaging means mounted on one end of said member that removably engage said engageable means and hold said first tubular member in communication with said discharge opening; a rigid annular member mounted on the outer end of said first tubular member and extending outwardly therefrom; a second tubular member that has the interior rearward surface of the bore therein movably engage said annular member, with said second tubular member longitudinally and angularly adjustable relative to said first tubular member; means that maintain said first and second tubular members in communication and movable engagement with one another; a plate pivotally supported in said second tubular member; handle means which when actuated vary the position of said plate to control the flow of material from said second tubular member; and spring means that maintain said plate in the closed position except when said handle is actuated.

8. A removably mountable tubular material discharge member for use with a portable bin which includes: two rigid vertical members that may be mounted in a fixed position on a bin disposed on opposite sides of a discharge opening in communication with the interior of said bin, with said members having vertical slots formed on the opposing faces thereof; a first tubular discharge member; flange means mounted on one end of said first tubular member that removably engage said slots and hold said first tubular member from said two rigid members in communication with said discharge opening; a rigid ring mounted on the outer end portion of said first tubular member, and positioned substantially normal to the longitudinal axis thereof; a second tubular member that has the interior rearward surface of the bore therein movably engage said ring; an inwardly extending annular member mounted on the interior rearward surface of said second tubular member that maintains said first and second tubular members in movable engagement with one another, and permits said second tubular member to be longitudinally and angularly adjusted relative to said first tubular member; a shaft extending across the bore in said second tubular member and rotatably supported in and extending through openings formed in the side walls of said second tubular member; a handle affixed to the outwardly extending portions of said shaft; an annular plate of slightly smaller diameter than the diameter of the bore of the portion of said second tubular member through which said shaft extends, with said plate rigidly affixed to said shaft and positioned within the confines of said second tubular member; a stop mounted on the interior surface of said plate when said plate is in the closed position; and a spring that is affixed to said second tubular member and a portion of said handle that holds said plate in a closed position against said stop except when said plate is moved by actuation of said handle to permit material to flow from said second tubular member.

9. A removably mountable tubular material discharge member for use with a portable bin that has a discharge opening which includes: a first tubular member; means mountable in a fixed position on a bin adjacent a discharge opening in communication with the interior of said bin, with said means defining two oppositely disposed vertical slots; flange means mounted on one end of said member that removably engage said slots and hold said first tubular member in communication with said discharge opening; a second tubular member; means to movably join said first and second tubular members in communication with one another, with said second member longitudinally and angularly adjustable relative to said first tubular member; a plate movably mounted in said second tubular member that controls the flow of material therefrom; handle means to vary the position of said plate member; and spring means that maintain said plate in a normally closed position.

10. A combined gate mechanism and safety plate holder which includes: two laterally spaced vertical members that may be rigidly mounted on a storage bin on each side of a discharge opening in communication with the interior thereof, with each of the opposing faces of said members having two vertically extending grooves defined thereon; a horizontal rigid member connecting the lower ends of said vertical members; a substantially rectangular plate of larger dimensions than said discharge opening slidably mounted for vertical movement in the innermost set of said grooves; a lever pivotally supported from one of said vertical members; a link movably connecting the upper portion of said plate and the inner end of said lever; a semi-circular plate extending outwardly from said rigid member on which said lever is mounted, with said plate having a plurality of circumferentially spaced holes formed therein, and said lever having an opening formed therein that may be brought into registry with any one of said openings in said plate by movement of said lever; a rigid elongated member that may engage any one of said openings in said plate and said opening in said lever to lock said lever in a position to hold said plate in the desired material flow controlling position relative to said discharge opening; and a safety plate that may be removably inserted in the outermost pair of said grooves to completely block said discharge opening irrespective of whether said lever actuated plate is in an open or closed position.

References Cited in the file of this patent

UNITED STATES PATENTS

| Number | Name | Date |
|---|---|---|
| 711,470 | Caswell | Oct. 21, 1902 |
| 771,918 | Munn | Oct. 11, 1904 |
| 1,486,206 | Venable | Mar. 11, 1924 |
| 1,632,103 | Venable | June 14, 1927 |
| 1,867,462 | Mercer | July 12, 1932 |
| 2,304,622 | Barrett | Dec. 8, 1942 |
| 2,507,873 | Ward | May 16, 1950 |